(12) United States Patent
    Gutierrez Flores

(10) Patent No.: US 10,534,150 B2
(45) Date of Patent: *Jan. 14, 2020

(54) BEND RADIUS GUIDE

(71) Applicant: International Business Machines Corporation, Armonk, NY (US)

(72) Inventor: Marco Mauricio Gutierrez Flores, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/281,144

(22) Filed: Feb. 21, 2019

(65) Prior Publication Data

US 2019/0317295 A1    Oct. 17, 2019

Related U.S. Application Data

(63) Continuation of application No. 15/955,179, filed on Apr. 17, 2018, now Pat. No. 10,295,777.

(51) Int. Cl.
    *G02B 6/46*     (2006.01)
    *G02B 6/44*     (2006.01)
    *H01B 7/18*     (2006.01)

(52) U.S. Cl.
    CPC .............. *G02B 6/4478* (2013.01); *H01B 7/18* (2013.01)

(58) Field of Classification Search
    USPC .......................................................... 385/135
    See application file for complete search history.

(56) References Cited

U.S. PATENT DOCUMENTS

| 5,640,476 | A  | 6/1997  | Womack et al.   |
| 6,388,193 | B2 | 5/2002  | Maynard et al.  |
| 6,675,458 | B1 | 1/2004  | Davidson et al. |
| 7,310,472 | B2 | 12/2007 | Haberman        |
| 7,676,132 | B1 | 3/2010  | Mandry et al.   |
| 2004/0100790 | A1 | 5/2004 | Bryant et al.   |

FOREIGN PATENT DOCUMENTS

| CN | 205138397 U   | 4/2016 |
| CN | 205209412 U   | 5/2016 |
| JP | 2009171794 A  | 7/2009 |

OTHER PUBLICATIONS

"Fast-Drop: Fiber Bend Radius Control Modules," Device Technologies, Inc., Printed: Feb. 14, 2018, pp. 1-2. http://www.devicetech.com/products-cable-management/fast-drop.
Gutierrez Flores, "Bend Radius Guide", U.S. Appl. No. 15/955,179, filed Apr. 17, 2018.
IBM, List of IBM Patents or Patent Applications Treated as Related, Feb. 20, 2019, 2 pages.

*Primary Examiner* — Eric Wong
(74) *Attorney, Agent, or Firm* — James L. Olsen

(57) ABSTRACT

Aspects of the present disclosure relate to a cable bend radius guide. The cable bend radius guide comprises a flexibly rigid linear material of a predetermined length having a plurality of pairs of corresponding bend radius markers each separated by a predetermined distance along the predetermined length. The cable bend radius guide further comprises at least one constraint configured to fasten a first bend radius marker and a second bend radius marker of each pair of bend radius markers together to cause a portion of the flexibly rigid linear material between the first bend radius maker and second bend radius marker of each pair of bend radius markers to generate a substantially circular loop having a minimum bend radius corresponding to a cable's minimum bend radius.

20 Claims, 6 Drawing Sheets

BEND RADIUS GUIDE

BACKGROUND

The present disclosure relates generally to the field of cabling, and in particular to a cable bend radius guide.

Cables are used for inter-component transmission within systems. For example, electrical cables are used to transport current between current sources and sinks (e.g., a power outlet and a television (TV)). Networking cables are used to transport data (e.g., telecommunication signals) between computing components (e.g., a client and a server). Cables typically include an outer shell (e.g., a cable jacket) which insulates and shields inner components of the cable. Various types of cables exist, including fiber optic cables, coaxial cables, power cables, patch cables, and others.

SUMMARY

Embodiments of the present disclosure related to a cable bend radius guide. The cable bend radius guide can comprise a flexibly rigid linear material of a predetermined length having a plurality of pairs of corresponding bend radius markers each separated by a predetermined distance along the predetermined length. The cable bend radius guide can further comprise at least one constraint configured to fasten a first bend radius marker and a second bend radius marker of each pair of bend radius markers together to cause a portion of the flexibly rigid linear material between the first bend radius maker and second bend radius marker of each pair of bend radius markers to generate a substantially circular loop having a minimum bend radius corresponding to a cable's minimum bend radius.

Embodiments of the present disclosure also include a method of bending cables using a cable bend radius guide. The method comprises providing a cable bend radius guide, the cable bend radius guide comprising a flexibly rigid linear material of a predetermined length having a plurality of pairs of corresponding bend radius markers each separated by a predetermined distance along the predetermined length, wherein each pair of bend radius markers of the plurality of pairs of bend radius markers are distinguishable from each other. The cable bend radius guide further comprises at least one restraint configured to fasten a first bend radius marker and a second bend radius marker of each pair of bend radius markers together. The method can further include obtaining a cable requiring bending. The method can further include conjoining a first pair of bend radius markers by holding the first bend radius marker and the second bend radius marker of the first pair of bend radius markers together such that they are in proximity to each other and adjacent, wherein conjoining the first pair of bend radius markers generates a substantially circular loop having a minimum bend radius corresponding to the cable's minimum bend radius. The method can further comprise restraining the first pair of bend radius markers using the at least one restraint and bending the cable using the substantially circular loop as a reference such that the cable's bend radius is at least the minimum bend radius.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 3-1 is a diagram illustrating the cable bend radius guide of FIG. 2 when the first pair of bend radius markers are conjoined, in accordance with embodiments of the present disclosure.

FIG. 3-2 is a diagram illustrating the cable bend radius guide of FIG. 2 when the second pair of bend radius markers are conjoined, in accordance with embodiments of the present disclosure

Figure 1:
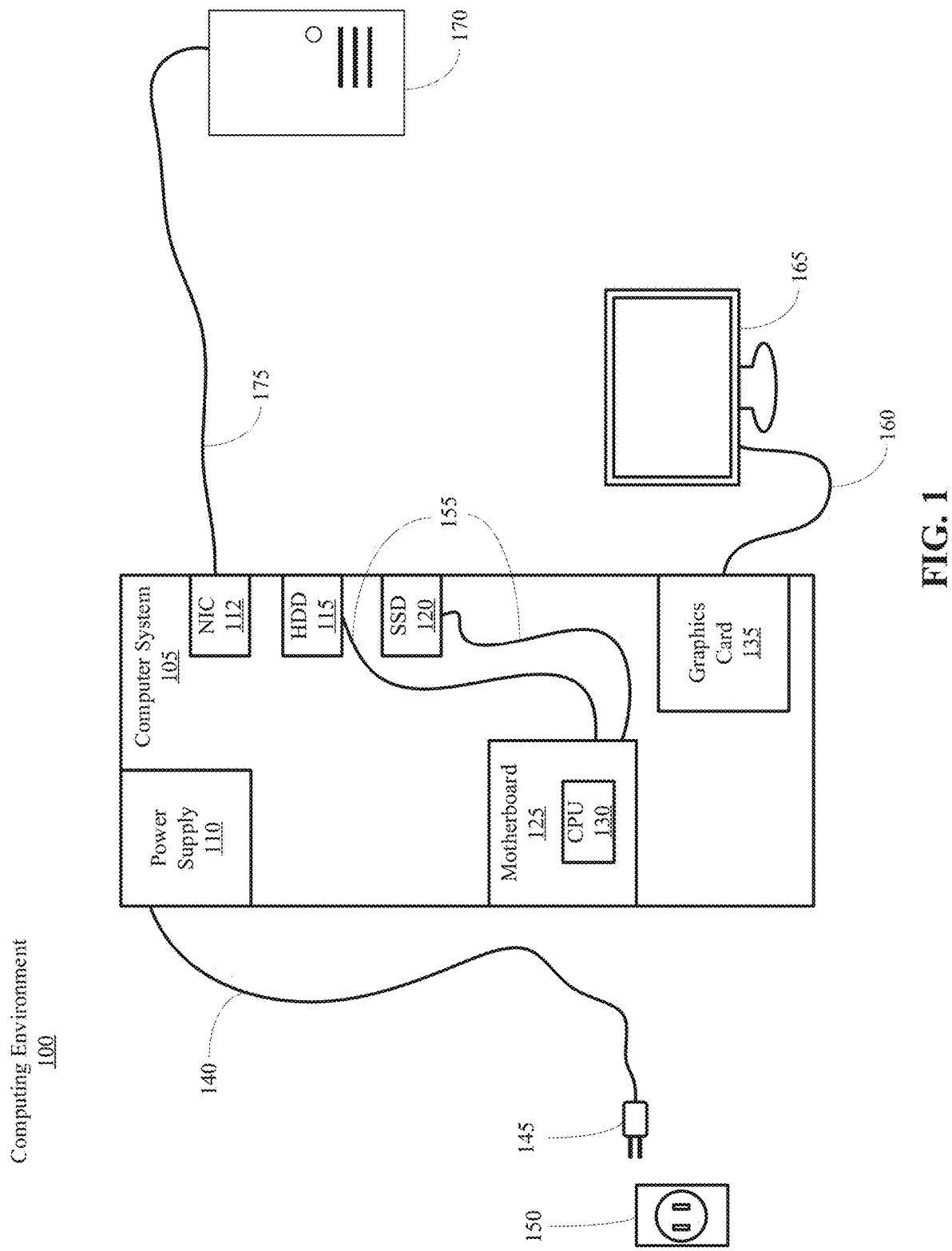
FIG. 1 is a block diagram illustrating various components in a computing environment.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of cabling, and in particular to a cable bend radius guide. While the present disclosure is not necessarily limited to such applications, various aspects of the disclosure may be appreciated through a discussion of various examples using this context.

Cables are used for inter-component transmission within systems. Various types of cables exist. For example, fiber optic cables include optical fibers (e.g., strands of glass) configured to transmit light throughout the length of the cable, which allows data transport between components. Power cables include a copper or aluminum conductor shielded by a non-conductive jacket for current transport. This can be used to provide power to systems via alternating current (AC) or direct current (DC). Ethernet and Serial ATA (SATA) cables can include a plurality of conducting wires separated by insulation coatings and/or separators to allow data transfer between computing components (e.g., processors, hard drives, circuit boards, machines, etc.).

Cables can be damaged over their lifespan. For example, bending cables can damage, kink, and/or shorten the lifespan of cables. This can hinder the travel of current, signals, and/or light through the bent cables. In many instances, cables can endure bending up to a certain extent. The smallest bend radius a cable can endure without being damaged is referred to as the "minimum bend radius". When a bend radius of a cable falls below its minimum bend radius, irreversible damage can be caused to the cable.

When installing a server (or other hardware), there can be a large number of varying length/type cables that require routing. The various cables can have different slack depending on the required routing path and available cable length. Depending on the amount of cable slack, some cables may require winding to minimize congestion within the server while maintaining organization. Further, depending on the required routing paths, some cables may require bending around specific components or structures. If the bend radius for cables during winding or bending falls below their respective minimum bend radius, cable damage can occur. For example, if a fiber optic cable falls below its minimum bend radius, the optical fibers within the cables can crack or shatter, allowing light to escape the fibers (and thus compromising data transfer). Various types of cables with distinct minimum bend radii within a computing environment may require bending or winding. Accordingly, a solution to ensuring each type of cable within a computing environment exceeds its minimum bend radius when bending or winding the cables is sought.

Aspects of the present disclosure relate to a cable bend radius guide. The cable bend radius guide can include one or more pairs of bend radius markers. The pairs of bend radius markers can be separated by a distance such that when they are conjoined, they form a loop (e.g., a substantially circular shape) having a bend radius corresponding to a minimum bend radius of a given cable. Upon conjoining a pair of bend radius markers, the pair of bend radius markers can be restrained (e.g., using any suitable attachment, such as tie-attachments, magnets, zip-ties, adhesives, etc.). The cable can then be bent/wound using the loop formed in between the bend radius markers. In some embodiments, a plurality of bend radius markers can be disposed on the cable bend radius guide and can correspond to the minimum bend radius of a variety of cable types.

Embodiments of the present disclosure overcome the aforementioned cabling complications. By utilizing a cable bend radius guide having bend radius markers which facilitate the bending of cables, damage to cables can be prevented. This can ensure that each type of cable exceeds its respective minimum bend radius. Further, by bending the cables near their respective minimum bend radius, congestion in environments including cables can be reduced. This can reduce airflow impedance and may reduce the resources required to cool computing components.

Though reference is made specifically to overcoming cabling issues in computing environments, aspects of the present disclosure can also be directed to other industries or applications, such as piping, tubing, hosing, wiring, etc. In these situations, damage/kinks to piping, tubing, hosing, wiring, etc. can be mitigated or reduced using the cable bend radius guide.

Embodiments of the present disclosure include an adjustable solution to managing the bending of a variety of cable types. For example, the bend radius markers can be repositioned and anchored to the cable bend radius guide based on several distinct minimum bend radii. The cable bend radius guide is also convenient, as bend radius markers which correspond to specific cable types can be easily distinguishable from each other. By simply conjoining corresponding pairs of bend radius markers, a substantially circular loop can be generated which includes a bend radius corresponding to a minimum bend radius of a cable of interest. Further, the bend radius markers can be restrained in place in a convenient manner, such that a user can use his or her hands to bend the cable of interest based on the substantially circular loop generated in between bend radius markers.

Embodiments of the present disclosure also relate to a portable solution to facilitating the bending of cables. Because the cable bend radius guide will typically be compact and lightweight, routing, installing, and reconfiguring cables can be completed where managing cabling is required (e.g., within a server enclosure or within a computer tower).

Referring now to the figures, FIG. 1 is a block diagram illustrating various components in a computing environment 100. The computing environment 100 includes a computer system 105 having a power supply 110, network interface controller (NIC) 112, hard disk drive (HDD) 115, solid state drive (SDD) 120, motherboard 125, central processing unit (CPU) 130, and graphics card 135. Further, the computing environment 100 includes a monitor 165, electrical outlet 150, and server 170.

In accordance with aspects of the present disclosure, various cables can be used to interconnect various components included in the computing environment 100. For example, the computer system 105 can receive power from the electrical outlet 150 through a power cable 140. The power cable 140 can include a plug 145 having male pins configured to be received by female receptacles included on the electrical outlet 150. Upon connection of the plug 145 to the outlet 150, the power supply 110 receives power through the power cable 140, and distributes the power to components (e.g., the motherboard 125, CPU 130, graphics card 135, etc.) within the computer system 105. The NIC 112 can be configured to transmit data to and/or receive data from the server 170 through a fiber optic cable 175. The fiber optic cable 175 includes optical fibers (e.g., glass strands), which allow light to be transmitted along the length of the fiber optic cable 175. This can be used for high-speed data transfer between the computer system 105 and server 170. The HDD 115 and SSD 120 are devices which store data in the computer system 105. When the computer system 105 requires access to (e.g., read or write access) the HDD 115 and/or SSD 120, the computer system 105 utilizes Serial ATA (SATA) cables 155 to facilitate data transfer between the HDD 115 and/or SSD 120 and the motherboard 125. The graphics card 135 transmits image data to the monitor 165 through a High-Definition Multimedia Interface (HDMI) cable 160. This allows the graphics data processed by a graphics processing unit (GPU) within the graphics card 135 to be output by the monitor 165.

As illustrated in FIG. 1, various types of cables can be required in a typical computing environment. Damage can be caused to the various cables when routing, storing, installing, reconfiguring, etc. the cables. Specifically, if the cables are bent below a minimum bend radius for each respective cable type, irreversible damage can be caused to the cables, which can impede or debilitate performance.

The various types of cables depicted in FIG. 1 can have varying minimum bend radii. For example, the power cable 140 can have a first minimum bend radius $R_1$ (e.g., 3 cm), the SATA cables 155 can have a second minimum bend radius $R_2$ (e.g., 5.5 cm), the HDMI cable 160 can have a third minimum bend radius $R_3$ (e.g., 7.2 cm), and the fiber optic cable 175 can have a fourth minimum bend radius $R_4$ (e.g., 10 cm). Accordingly, a desired bend radius that is permissible for the power cable 140 may be impermissible for the fiber optic cable 175 (e.g., if $R_1 < R_4$).

Based on the aforementioned, a solution to managing bending of varying types/lengths of cables included in the computing environment 100 is sought. This can reduce damage caused to the cables during installation, routing, storage, and the like. By reducing damage caused to cables, performance hindrance can be avoided. Further, reducing damage caused to cables is economically/environmentally beneficial, as cable replacements are less likely to be required, conserving monetary resources and physical resources required for constructing the cables.

While FIG. 1 illustrates computing environment 100 with a single computer system 105 and a single server, suitable computing environments for implementing embodiments of this disclosure can include any number of computer systems and/or servers. The various models, modules, systems, and components illustrated in FIG. 1 can exist, if at all, across a plurality of controllers and devices. For example, some embodiments can include two servers. The two servers can be communicatively coupled using any suitable communications connection (e.g., using a WAN, a LAN, a wired connection, an intranet, or the Internet).

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary. For example, in some embodiments, the graphics card 135 and NIC 112 are disposed on the motherboard 125.

Figure 2:
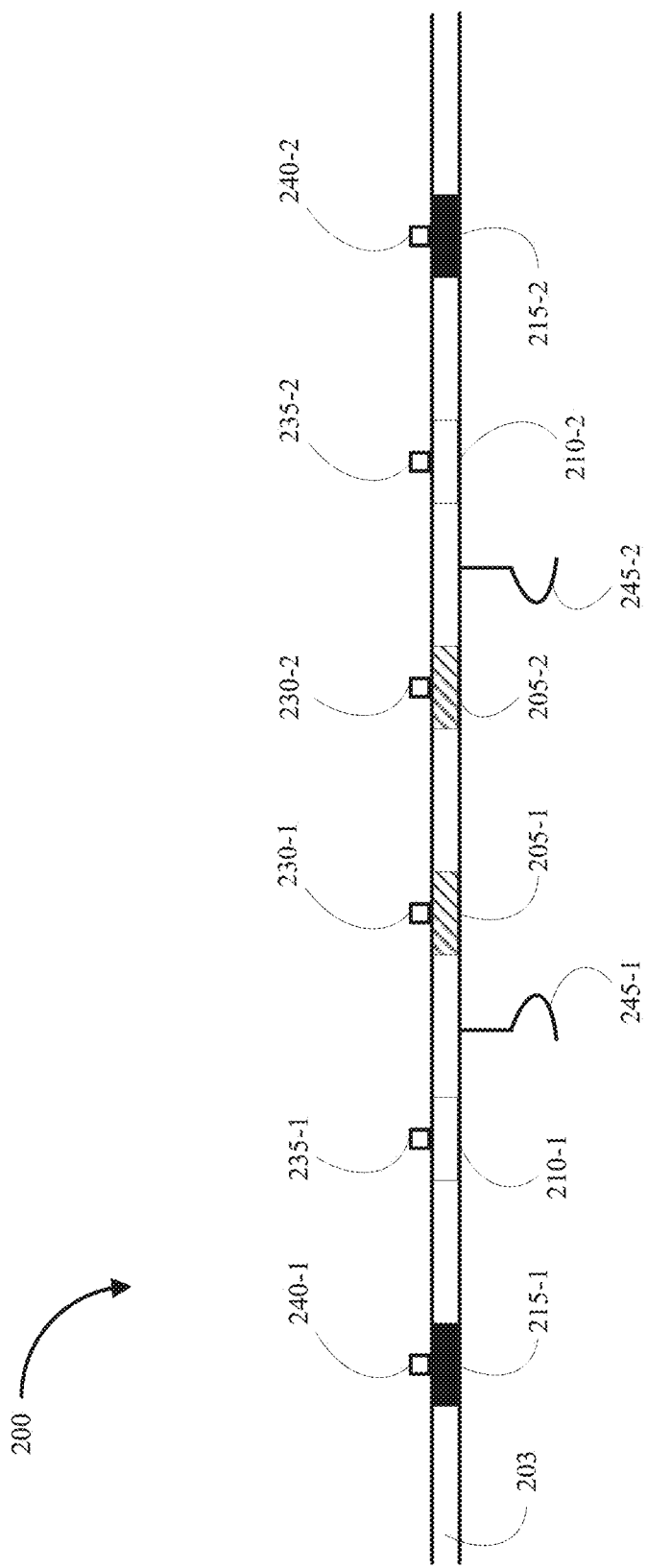
FIG. 2 is a diagram illustrating a side view of a cable bend radius guide, in accordance with embodiments of the present disclosure.

FIG. 2 is a diagram illustrating a side view of a cable bend radius guide 200, in accordance with embodiments of the present disclosure. The cable bend radius guide 200 includes a first pair of bend radius markers 205 (e.g., individually referred to as "bend radius marker 205-1" and "bend radius marker 205-2), a second pair of bend radius markers 210 (e.g., individually referred to as "bend radius marker 210-1" and "bend radius marker 210-2), and a third pair of bend radius markers 215 (e.g., individually referred to as "bend radius marker 215-1" and "bend radius marker 215-2). The first pair of bend radius markers 205, second pair of bend radius markers 210, and third pair of bend radius markers 215 are herein collectively referred to as "bend radius markers 205, 210, and 215".

The cable bend radius guide 200 can be used to guide the bending of various types of cables using the bend radius markers 205, 210, and 215. To do so, corresponding pairs of bend radius markers 205, 210, and 215 are conjoined (e.g., bend radius marker 205-1 is conjoined with bend radius marker 205-2, bend radius marker 210-1 is conjoined with bend radius marker 210-2, and bend radius marker 215-1 is conjoined with bend radius marker 215-2) such that they are in physical contact (or in close proximity) and adjacent to each other. This generates a substantially circular loop in between the conjoined pair of bend radius markers. The loop can then be used as a guide for bending of cables. For example, when conjoining the first pair of bend radius markers 205, a loop with a radius "$R_m$" can be generated. The radius "$R_m$" may correspond to the minimum bend radius of a given cable (e.g., a power cable, such as power cable 140 of FIG. 1). Accordingly, the selected cable can be wound up or bent using the cable bend radius guide 200 as a reference for the minimum bend radius.

Each pair of the bend radius markers 205, 210, and 215 can correspond to a minimum bend radius for a specific cable type. For example, the first pair of bend radius markers 205 may correspond to a minimum bend radius of a power cable (e.g., power cable 140 of FIG. 1), the second pair of bend radius markers 210 may correspond to a minimum bend radius of a SATA cable (e.g., SATA cables 155 of FIG. 1), and the third pair of bend radius markers 215 may correspond to a minimum bend radius of a fiber optic cable (e.g., fiber optic cable 175 of FIG. 1). This can enable the cable bend radius guide 200 to facilitate the bending of a variety of cables without falling below the minimum bend radius for any given cable. Though only three bend radius marker pairs are depicted in FIG. 2, any suitable number of bend radius marker pairs can be implemented on the cable bend radius guide 200. In some embodiments, the number of bend radius marker pairs depends on the number of different types of cables that require bending.

In some embodiments, pairs of bend radius markers 205, 210, and 215 are distinguishable from each other. The bend radius markers 205, 210, and 215 can be distinguishable in any manner. In some embodiments, the bend radius markers 205, 210, and 215 are visually distinguishable by using distinct colors for each bend radius marker pair. For example, the first pair of bend radius markers 205 can be a first color (e.g., red), the second pair of bend radius markers 210 can be a second color (e.g., blue), and the third pair of bend radius markers 215 can be a third color (e.g., yellow). In some embodiments, such as the embodiment depicted in FIG. 2, the bend radius markers 205, 210, and 215 can be distinguishable using patterns or textures. In some embodiments, the bend radius markers 205, 210, and 215 are distinguishable via numbers or text. For example, the first pair of bend radius markers 205 can be labeled "1", the second pair of bend radius markers 210 can be labeled "2", and the third pair of bend radius markers 215 can be labeled "3". In some embodiments, the markers can be labeled with the specific cables names based on the minimum bend radius they represent. For example, the first pair of bend radius markers 205 can be labeled "Power", the second pair of bend radius markers 210 can be labeled "SATA", and the third pair of bend radius markers 215 can be labeled "Fiber Optic". In some embodiments, the bend radius markers 205, 210, and 215 are distinguishable by touch. For example, textures and/or braille can be associated with specific cable radius marker pairs. However, any suitable manner of distinguishing the bend radius markers 205, 210, and 215 otherwise consistent herein is contemplated.

The cable bend radius guide 200 includes a body portion 203 in which the bend radius markers 205, 210, and 215 are disposed on. The body portion 203 can be made of any suitable material. In some embodiments, the body portion 203 is comprised of a flexible, yet rigid material (e.g., formable, conformable, bendable, etc.). For example, the body portion 203 can be flexible such that a loop can be generated by conjoining each pair of bend radius markers, yet rigid such that the loop maintains a uniform, substantially circular shape upon conjoining bend radius markers. In some embodiments, the flexural modulus and thickness of the material comprising the body portion 203 are considered. For example, a "sweet spot" between a flexural modulus and thickness can be selected as a suitable flexible yet rigid material. In these embodiments, a material with a relatively high flexural modulus and a small thickness (e.g., steel) could be used, or alternatively, a material with a relatively lower flexural modulus and a larger thickness (e.g., rubber) could be used.

In some embodiments, the body portion 203 is comprised of steel (e.g., galvanized steel wire or stainless steel wire), as steel is sufficiently flexible and rigid (as well as readily available). Additional examples of materials the body portion 203 can be comprised of include plastics (e.g., nylon, acrylonitrile butadiene styrene (ABS), high-density polyethylene (HDPE), polystyrene, polysulfone, Teflon, polyimide, polyester, acetal, ultra-high-molecular-weight polyethylene (UHMW), polycarbonate, polypropylene, etc.), metals/alloys (aluminum, titanium, nickel etc.) manila, carbon fiber, composites, and rubber.

The cable bend radius guide 200 can be manufacturing using any suitable technique. For example, in some embodiments, the body portion 203 can be manufactured by stamping, CNC machining, casting, compression molding, transfer molding, injection molding, infusion, transfusion, protrusion, rolling (e.g., using a rolling mill) or other manufacturing methods. The manufacturing method used to form the body portion 203 may depend on the material the body portion 203 is comprised of. Likewise, the bend radius markers 205, 210, and 215, restraints, and bending guides 245 can be simultaneously manufactured/assembled with the body 203 or alternatively subsequently coupled to the body portion 203 (e.g., by mechanical fastening, adhesives, bonding, welding, or a different method). The body portion 203, bend radius markers 205, 210, and 215, restraints, and bending guides 245 can be manufactured using additive and/or subtractive manufacturing techniques. In some embodiments, manufacturing the components of the cable bend radius guide 200 can be completed using a computer system. For example, cable bend radius guide 200 schematics can be input into a computer system allowing the computer system to form the cable bend radius guide 200.

The cable bend radius guide 200 can be any suitable length. In some embodiments, the length of the cable bend radius guide 200 depends on the cable bend radius markers 205, 210, and 215. For example, in some embodiments, the length of the cable bend radius guide 200 depends on the bend radius marker with the largest minimum bend radius. In some embodiments, the cable bend radius guide 200 is a uniform length (e.g., 1 foot, 2 feet, 0.5 meters, 1 meter, etc.). However, the length of the cable bend radius guide 200 can vary.

In some embodiments, the bend radius markers 205, 210, and 215 are repositionable (e.g., movable) along the length of the cable bend radius device. For example, a minimum bend radius of a first cable can be determined (e.g., as provided by a manufacturer or experimentally determined), and the first pair of bend radius markers 205 can be spread apart based on the minimum bend radius "$R_m$" of the first cable. In this example, the distance between the first pair of bend radius markers 205 can be determined based on the formula: Circumference (C)=$2\pi R_m$, the circumference being the distance required between the first pair of markers 205 such that a loop (e.g., circle) with the minimum radius "$R_m$" is generated. This can be completed for other bend radius markers (e.g., bend radius markers 210 and 215) based on a minimum bend radius of other cables.

If the bend radius markers 205, 210, and 215 are repositionable along the length of the cable bend radius guide 200, they can be configured to be "anchored" or "free" with respect to the body portion 203 of the cable bend radius guide 200. For example, the bend radius markers 205, 210, and 215 can include attachments (latches, clamps, ties, hardware assembly etc.) such that they can be fastened onto the body portion 203 into an "anchored" state. Upon deactivating the attachment (e.g., unlocking the latch, untying a tie, unscrewing the hardware assembly, etc.), the bend radius markers 205, 210, and 215 can be in a "free" state such that they are repositionable with respect to the body portion 203. In some embodiments, only a single pair of bend radius markers may be required. For example, if the single pair of bend radius markers is repositionable, it may be movable to adapt to a variety of cables having distinct minimum bend radii.

Though pairs of bend radius markers 205, 210, and 215 are depicted as corresponding to each bend radius, in some embodiments, a single bend radius marker can have multiple distinct pairings with other bend radius markers. For example, a left-most bend radius marker "$M_1$" can have three different pairing bend radius markers, "$M_2$", "$M_3$", and "$M_4$". In this embodiment, the left-most marker $M_1$ can pair with marker $M_2$ to correspond to a first minimum bend radius $R_1$, $M_3$ to correspond to a second minimum bend radius $R_2$, and $M_4$ to correspond to a third minimum bend radius $M_4$. This implementation can reduce the number of markers and/or restraints required, while still providing distinct marker sets for varying minimum bend radii.

In some embodiments, restraints can be associated with each of the bend radius markers. As depicted in FIG. 2, a restraint 230-1 can be coupled to bend radius marker 205-1, a restraint 230-2 can be coupled to bend radius marker 205-2, a restraint 235-1 can be coupled to bend radius marker 210-1, a restraint 235-2 can be coupled to bend radius marker 210-2, a restraint 240-1 can be coupled to bend radius marker 215-1, and a restraint 240-2 can be coupled to bend radius marker 215-2. The restraints 230-1, 230-2, 235-1, 235-2, 240-1, and 240-2 (herein collectively "restraints") can be used to conjoin the corresponding pairs of bend radius markers 205, 210, and 215 such that they remain fastened while using the cable bend radius guide 200 as a guide to bend one or more cables.

The restraints can be any suitable structure configured to fasten pairs of bend radius markers 205, 210, and 215 together. For example, the restraints can be magnets, latches, lock/key pairs, hooks, hook and loop pairs (e.g., VELCRO® Straps (Velcro Industries B.V. LIMITED LIABILITY COMPANY NETHERLANDS Castorweg 22-24 Curacao NETHERLANDS)), adhesives, rings, hardware assembly (e.g., screws, bolts, lugs, nuts), zip-ties, etc. In an example, if bend radius marker 205-1 and bend radius marker 205-2 include respective magnetic restraints 230-1 and 230-2, the first pair of bend radius markers 205 can be conjoined by bringing the magnetic restraints 230-1 and 230-2 in close proximity, such that a magnetic force holds the first pair of bend radius markers 205 together. Similarly, if restraint 235-1 is a Velcro hook strip and restraint 235-2 is a Velcro loop strip, the restraints 235-1 and 235-2 can be fastened together such that the second pair of bend radius markers 210 are conjoined.

In some embodiments, different restraint types can be used for different pairs of bend radius markers 205, 210, and 215. For example, the first pair of markers 205 may include latch restraints 230-1 and 230-2, the second pair of markers 210 may include Velcro restraints 235-1 and 235-2, and the third pair of markers 215 may include magnetic restraints 240-1 and 240-2. In some embodiments, the variation of restraint types depends on the force required to maintain contact (or proximity) between the pairs of bend radius markers 205, 210, and 215. For example, if latch restraints are configured to restrain 10 pound-force (lbf) and magnetic restraints are configured to restrain 5 lbf, and the first pair of bend radius markers 205 requires 8 lbf to maintain contact between bend radius marker 205-1 and bend radius marker 205-2, and the second pair of bend radius markers 210 requires 4 lbf to maintain contact between bend radius marker 210-1 and bend radius marker 210-2, then latch constraints can be used for the first pair of bend radius markers 205 and magnetic restraints may be used for the second pair of bend radius markers 210. Accordingly, a force required to maintain proximity between each pair of bend radius markers 205, 210, and 215 can be determined. Further, a restraint force for each of the restraints can also be determined. Based on the determinations, a proper restraint can be selected for each pair of bend radius markers 205, 210, and 215 (e.g., such that the restraint force exceeds the force required to maintain proximity between each pair of bend radius markers 205, 210, and 215).

In embodiments, the width (e.g., the distance along the length of the body portion 203) of the bend radius markers 205, 210, and 215 can vary. In some embodiments, the width of the bend radius markers 205, 210, and 215 depends on the distinguishing features of the markers. For example, the width of the pairs of bend radius markers 205, 210, and 215 can depend on text displayed on each marker. In some embodiments, the width of the bend radius markers 205, 210, and 215 depends on the total number of bend radius markers. For example, if there are a significant number of bend radius markers (e.g., 10-20 bend radius markers), the markers can have a narrow width such that the plurality of markers do not overlap on the cable bend radius guide 200. In some embodiments, the width of the bend radius markers 205, 210, and 215 depends on the distance between the closest pair of bend radius markers. For example, if bend radius marker 205-1 is to be disposed 5 cm from bend radius marker 210-1, the width of the bend radius markers 205-1 and 210-1 can be sufficiently narrow such they do not overlap.

In some embodiments, the cable bend radius guide 200 includes a first bending guide 245-1 and a second bending guide 245-2 (herein collectively "bending guides 245"). The bending guides 245 can be used to assist with bending the cable after pairs of bend radius marker 205, 210, and 215 are conjoined. For example, as depicted in FIG. 2, if the restraints 235-1 and 235-2 are fastened such that the second pair of bend radius markers 210 are conjoined, the bending guides 245 can protrude out from the cable bend radius guide 200 such that a cable can be received and retained by the bending guides 245 during bending or winding of the cables.

In some embodiments, the bending guides 245 are open hooks, such that cables can be wound around the bend radius guide 200 using the bending guides 245. In some embodiments, the bending guides 245 are loops, such that the cable can be fed into the bending guides 245 when bending or winding cables. However, the bending guides 245 can be any other suitable structure configured to receive and retain cables. For example, in some embodiments, the bending guides 245 can be clamps, latches, or parabolic-shaped structures (e.g., configured to receive and retain cables at the vertex). In some embodiments, the bending guides 245 are sized and shaped depending on specific cables. For example, thinner cables may require smaller hooks/loops as bending guides 245. In contrast, thicker cables may require larger hooks/loops as bending guides 245.

The bending guides 245 can be oriented with respect to the body portion 203 such they are configured to receive and retain a cable. For example, the bending guides 245 can be approximately orthogonal to a side (e.g., or tangential point) of the body portion 203. In some embodiments, the bending guides 245 can be disposed in an opposite direction of the restraints. The bending guides 245 can be disposed such that upon forming the substantially circular loop, they are on the exterior or interior of the loop, depending on the sought bending/winding position. For example, in embodiments in which the cable is wound around the substantially circular loop, the bending guides 245 can be disposed on the exterior (e.g., the opposite side the restraints are disposed on) of the substantially circular loop. In embodiments in which the cable is wound inside of the substantially circular loop, the bending guides 245 can be disposed on the interior (e.g., the same side the restraints are disposed on) of the substantially circular loop. In embodiments in which the cable is wound parallel to substantially circular loop, the bending guides 245 can be disposed approximately 90 degrees from the position of the restraints along the body portion 203.

Any number of bending guides 245 can be disposed on the cable bend radius guide 200. The number of bending guides 245 can depend on the number of bend radius markers disposed along the body portion 203. For example, in some embodiments, bending guides 245 can correspond with pairs of bend radius markers, such that the bending guides 245 are in a suitable position to assist bending or winding of cables when a respective pair of bend radius markers are conjoined. In some embodiments, the bending guides 245 can be repositionable along the body portion 203 of the cable bend radius guide 200. In these embodiments, only a single pair of bending guides 245 may be necessary, as the bending guides 245 can be repositionable to assist with bending or winding for various bend radius marker pairs.

Though reference is made to disposing bend radius markers 205, 210, 215 based on minimum bend radii of a variety of cables, in some embodiments, other metrics can be used to dictate cable bending. For example, curvature, circumference, and/or arcs can be used to dictate cable bending.

Figure 3:
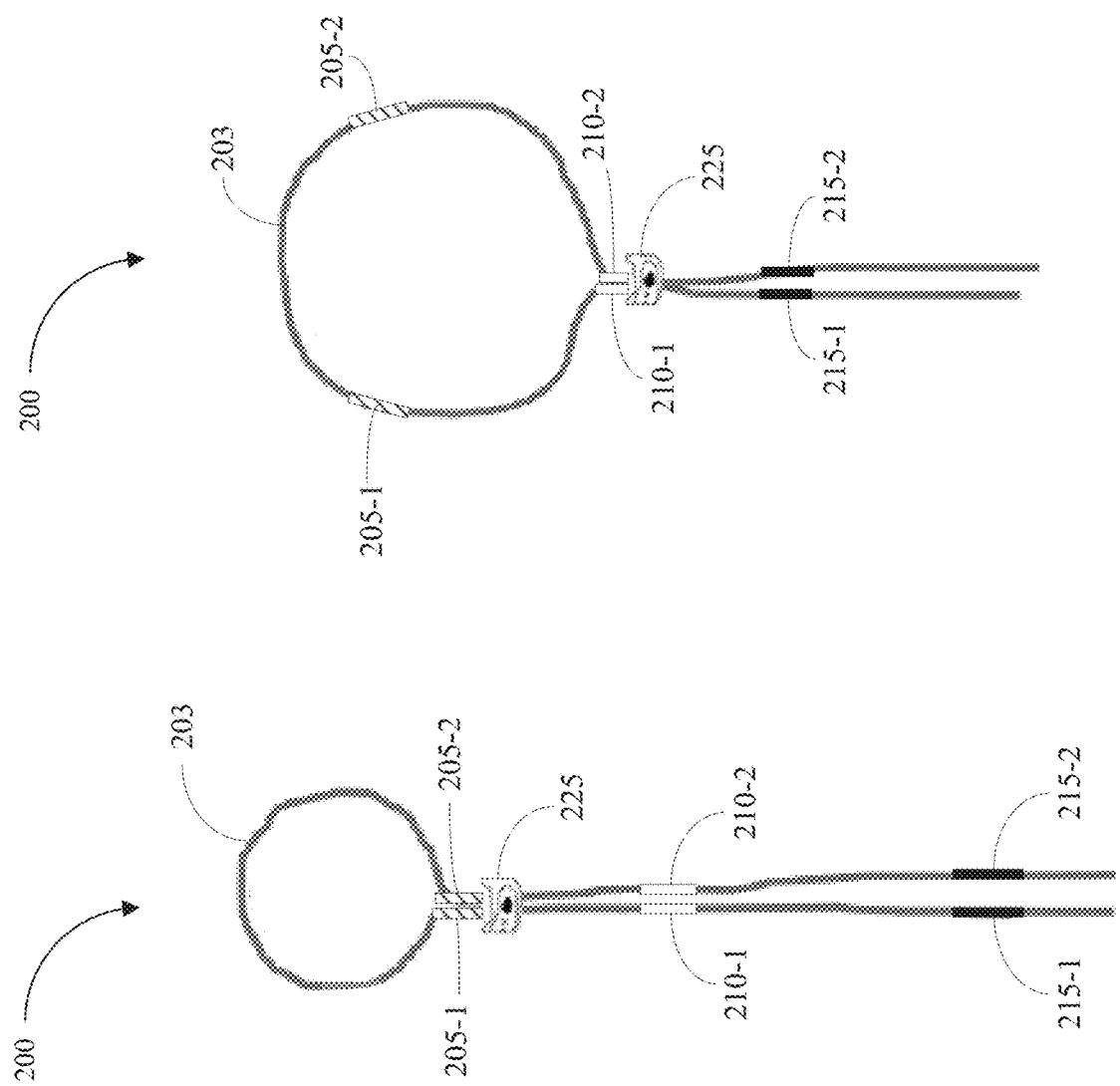

Referring now to FIG. 3-1, shown is a diagram illustrating the cable bend radius guide 200 when the first pair of bend radius markers 205 are conjoined, in accordance with embodiments of the present disclosure. Regarding FIG. 3-1, the cable bend radius guide 200 omits the restraints 230-1, 230-2, 235-1, 235-2, 240-1 and 240-2 and bending guides 245-1 and 245-2 of FIG. 2.

As depicted in FIG. 3-1, when the first pair of bend radius markers 205 are conjoined (e.g., brought in close proximity) and restrained, a substantially circular loop is formed (e.g., generated) for the segment of the body portion 203 in between the bend radius marker 205-1 and the bend radius marker 205-2. The loop has a radius that corresponds to a minimum bend radius of a cable designated for the first pair of bend radius markers 205. For example, the loop may have a radius corresponding to a minimum bend radius of a power cable (e.g., power cable 140 of FIG. 1).

As illustrated in FIG. 3-1, a repositionable tie-attachment 225 is used to restrain the first pair of bend radius guides 205. The tie-attachment 225 can be tightened to restrain and maintain contact between the bend radius marker 205-1 and the bend radius marker 205-2. The tie-attachment 225 can also be "un-tied" or loosened such that it can be repositioned along the length of the body portion 203. For example, the tie-attachment 225 can be repositioned to restrain the second pair of bend radius markers 210 or third pair of bend radius markers 215 when they are conjoined, respectively.

Referring now to FIG. 3-2, shown is a diagram illustrating the bend radius guide 200 when the second pair of bend radius markers 210 are conjoined, in accordance with embodiments of the present disclosure. Regarding FIG. 3-2, the cable bend radius guide 200 omits the restraints 230-1, 230-2, 235-1, 235-2, 240-1 and 240-2 and bending guides 245-1 and 245-2 of FIG. 2.

As depicted in FIG. 3-2, when the second pair of bend radius markers 210 are conjoined (e.g., brought in close proximity) and restrained, a loop is formed (e.g., generated) for the segment of the body portion 203 in between the bend radius marker 210-1 and the bend radius marker 210-2. The loop has a radius that corresponds to a minimum bend radius of a cable designated for the second pair of bend radius markers 210. For example, the loop may have a radius corresponding to a minimum bend radius of a fiber optic cable (e.g., fiber optic cable 175 of FIG. 1).

The embodiment depicted in FIG. 3-2 depicts a second position in which the cable bend radius guide 200 can be implemented. By loosening or removing the tie-attachment 225, conjoining the second pair of bend radius markers 210, and restraining the second pair of bend radius markers 210 by tightening or fastening the tie-attachment 225, the second position is achieved. As can be seen in FIG. 3-2, the loop generated by conjoining the second pair of bend radius markers 210 is larger than the loop generated by conjoining the first pair of bend radius markers 205. This can similarly be completed with the third pair of bend radius markers 215, achieving a third position, which forms a loop larger than the loops formed by conjoining the first pair of bend radius markers 205 and second pair of bend radius markers 210. Though a tie-attachment 225 is depicted in FIG. 3-1 and FIG. 3-2, any other suitable restraint can be implemented (e.g., such as restraints 230-240 described in FIG. 2) as opposed to, or in addition to, tie-attachment 225.

Figure 4:
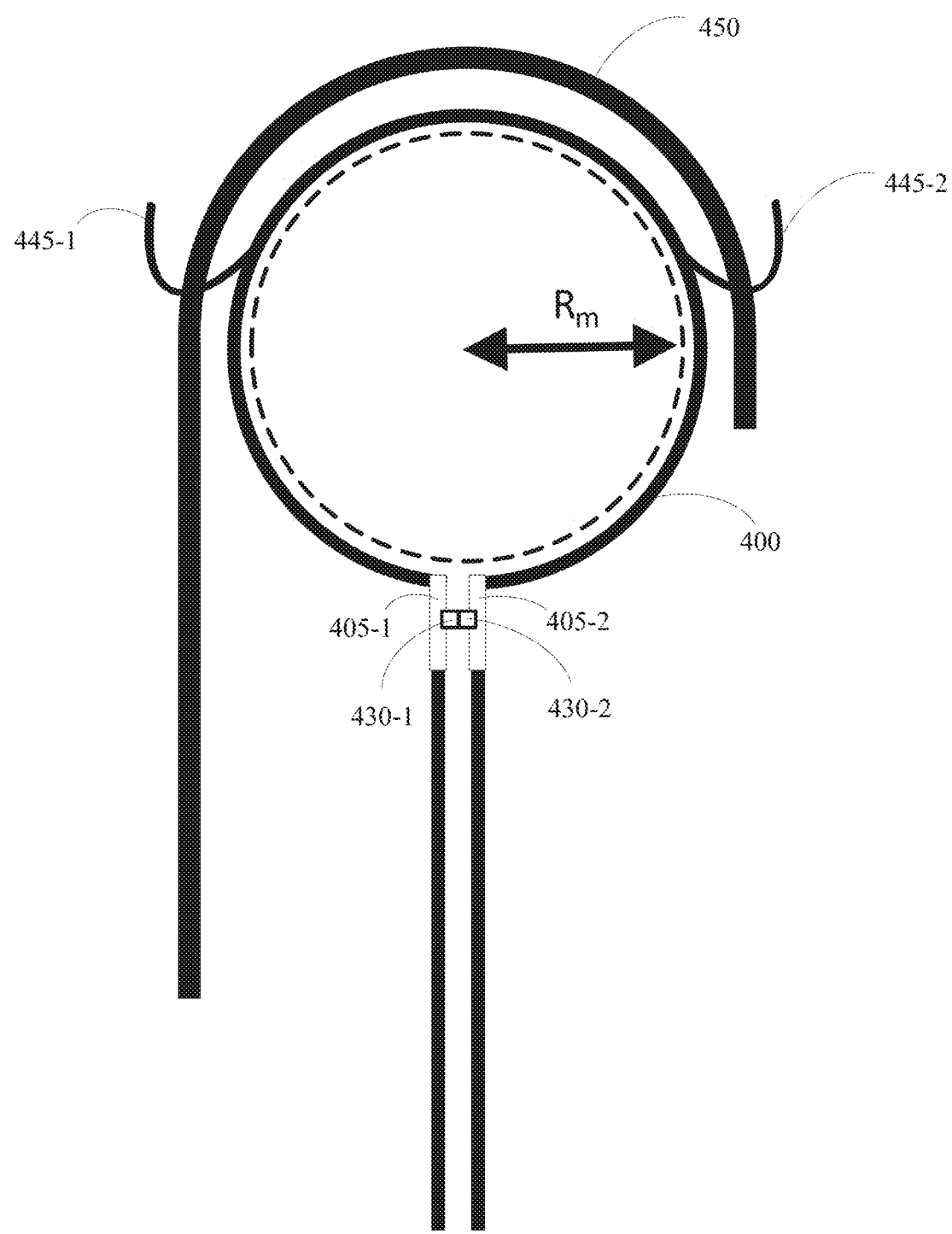
FIG. 4 is a diagram illustrating a cable bend radius guide facilitating the bending of a cable, in accordance with embodiments of the present disclosure

FIG. 4 is a diagram illustrating a cable bend radius guide 400 facilitating the bending of a cable 450, in accordance with embodiments of the present disclosure. The cable bend radius guide 400 includes a pair of bend radius markers 405 (herein individually "bend radius marker 405-1" and "bend radius marker 405-2"), a pair of restraints 430 (herein individually "restraint 430-1" and "restraint 430-2"), and a pair of bending guides 445 (herein individually "bending guide 445-1" and "bending guide 445-2"). As referenced in FIG. 4, the cable bend radius guide 400, bend radius markers 405, restraints 430, and bending guides 445 may be the same as or substantially similar to the cable bend radius guide 200, bend radius markers 205-215, restraints 230-240, and bending guides 245 of FIG. 2.

When the bend radius markers 405 are conjoined, a substantially circular loop is generated for the portion of the cable bend radius guide 400 in between the bend radius marker 405-1 and bend radius marker 405-2. The loop is depicted by the dashed line having a radius of "$R_m$", which corresponds to the minimum bend radius of the cable 450. The restraints 430 maintain the conjoined position of the bend radius markers 405, and allow a user to manually wind the cable 450 around the cable bend radius guide 400. The user is assisted with bending the cable via the bending guides 445, which, in accordance with the embodiment depicted in FIG. 4, are hooks used to wrap the cable 450 around the cable bend radius guide 400.

In some embodiments, the cable bend radius guide 400 can be configured based on the minimum bend radius of the cable 450. In these embodiments, one or more components of the cable bend radius guide 400 can be repositionable to adapt to varying cable types. For example, the bend radius markers 405, restraints 430, and bending guides 445 depicted in FIG. 4 can be repositionable. That is, the bend radius markers 405, restraints 430, and bending guides 445 can be movable along the length of the cable bend radius guide 400.

To configure the cable bend radius guide 400, a minimum bend radius of the cable 450 can first be determined. Based on the determined minimum bend radius, the bend radius markers 405 can be separated by a distance corresponding to the circumference of the circle having the minimum bend radius in accordance with Circumference (C)=$2\pi R_m$. In this example, the bend radius markers 405 are separated by the minimum bend radius $R_m$ multiplied by $2\pi$. The top of the bend radius markers 405 (e.g., the portion of the bend radius markers 405 proximate to the loop as depicted in FIG. 4) are then aligned to generate the loop having the radius $R_m$. After the bend radius markers 405 are repositioned, the bending guides 445 can be repositioned onto opposite directions of the loop, such that the cable 450 can be received and retained by each of the bending guides 445-1 and 445-2. Further, the restraints 430 can also be repositioned and aligned with respect to bend radius markers 405 (e.g., restraint 430-1 can be aligned with bend radius marker 405-1 and restraint 430-2 can be aligned with bend radius marker 405-2). In some embodiments, however, the restraints 430 can be fastened (e.g., permanently or detachably fastened) to the bend radius markers 405, and can be repositionable with the bend radius markers 405.

Though the top (as the circumference was measured with respect to the inner edges of the bend radius markers 405) of the bend radius markers 405 are used as a reference point to generate a loop having the minimum bend radius, in some embodiments, other portions of the bend radius markers 405 can be used as a reference point to form the loop having the minimum bend radius. For example, in some embodiments, the center points of the bend radius markers can be separated by a distance equal to the circumference of the circle having the minimum bend radius. In some embodiments, the bottom (e.g., the portion of the bend radius markers 405 distal from the loop as depicted in FIG. 4) of the bend radius markers can be separated by a distance equal to the circumference of the circle having the minimum bend radius. Accordingly, any portion of the bend radius markers 405 can be used as a reference to generate the loop having the minimum bend radius.

Figure 5:
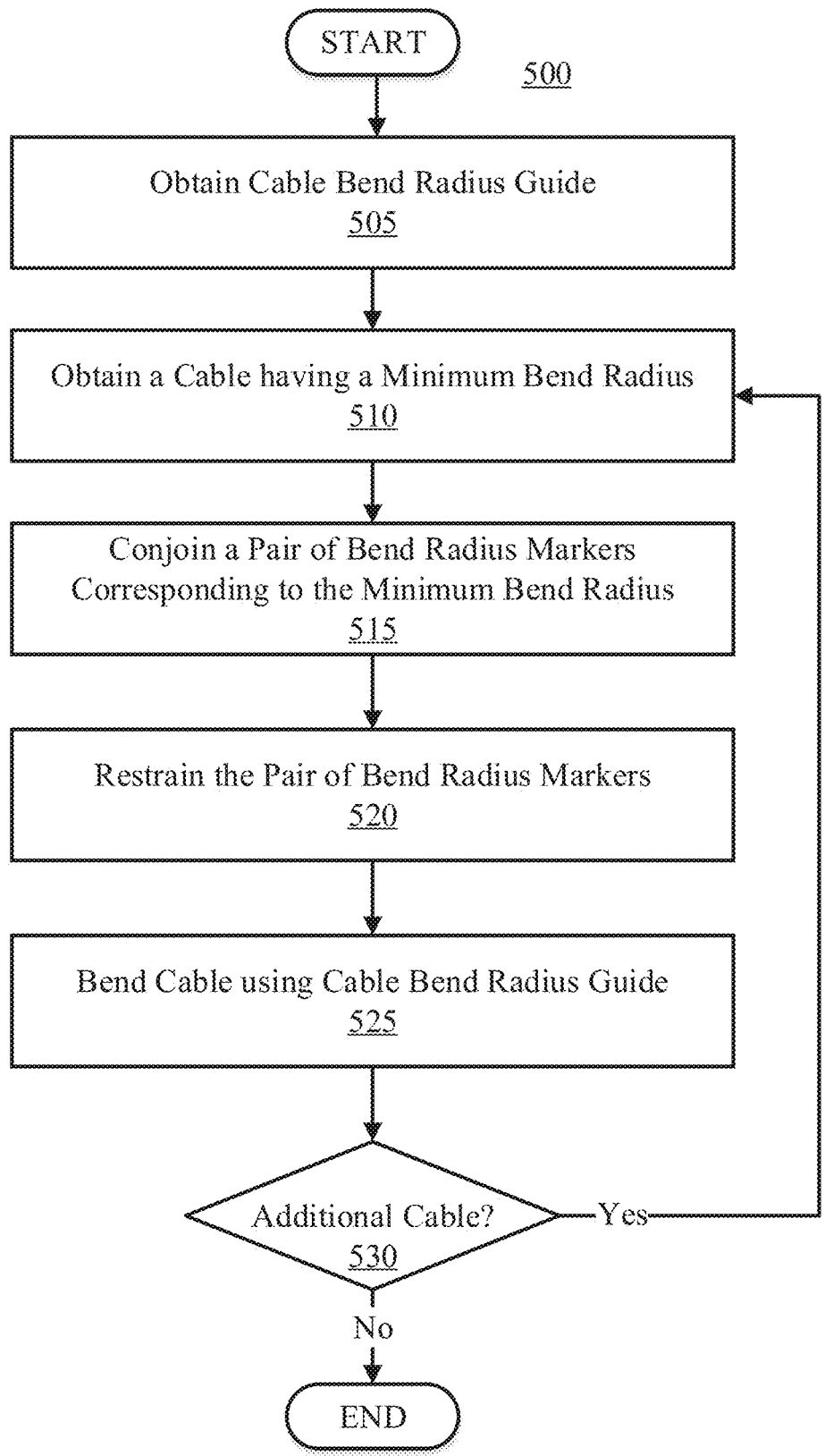
FIG. 5 is a flow diagram illustrating a process for bending one or more cables with a cable bend radius guide, in accordance with embodiments of the present disclosure.

FIG. 5 is a flow diagram illustrating an example process 500 for bending one or more cables with a cable bend radius guide, in accordance with embodiments of the present disclosure.

Process 500 begins by obtaining a cable bend radius guide. This is illustrated at step 505. The cable bend radius guide may be the same as, or substantially similar to, the cable bend radius guides 200 and 400 described in FIGS. 2-4. A cable requiring bending or winding having a minimum bend radius is then obtained. This is illustrated in step 510. The cable requiring bending may be any of the cables (e.g., the power cable 140, SATA cables 155, HDMI cable 160, and fiber optic cable 170) described in FIG. 1. Further, the cable may be substantially similar to the cable 450 described in FIG. 4. Additional examples of cables that may require bending and have a minimum bend radius include coaxial cables, direct-buried cables, ribbon cables, structured cables, shielded cables, heliax cables, filled cables, flexible cables, twisted pair cables, Ethernet cables, unshielded twisted pair (UTP) cables, telephone cables, VGA cables, DVI cables, DisplayPort cables, USB Connection cables, auxiliary cables and others.

After the cable bend radius guide and cable having the minimum bend radius are obtained, a pair of bend radius markers (e.g., bend radius markers 205, 210, and 215 of FIG. 2 or bend radius markers 405 of FIG. 4) on the cable bend radius guide corresponding to the minimum bend radius of the cable are conjoined. This is illustrated at step 515. To conjoin the pair of bend radius markers, a first bend radius marker and a second bend radius marker of the pair of bend radius markers are brought adjacent to each other (e.g., in close proximity or in physical contact), and aligned such that the distance between the pair of bend radius markers (e.g., or the distance between a portion of the bend radius markers) corresponds to the circumference of a circle (e.g., the loop) having the minimum bend radius.

The conjoined pair of bend radius markers are then restrained in the conjoined position. This is illustrated at step 520. The conjoined pair of bend radius markers can be restrained in any manner. For example, restraint mechanisms include magnets, latches, hooks, Velcro, rings, zip-ties, hardware assembly, tie-attachments, and the like. The restraints may be the same as, or substantially similar to, the restraints (e.g., restraints 230-1, 230-2, 235-1, 235-2, 240-1, 240-2 of FIG. 1, restraint 225 of FIG. 3-1 and FIG. 3-2, or restraints 430-1 and 430-2 of FIG. 4) previously described.

After the pair of bend radius markers are constrained, the cable is bent using the cable bend radius as a guide. This is illustrated at step 525. In some embodiments, the cable is bent parallel to the cable bend radius guide, mirroring the radius of the loop formed in the cable bend radius guide. In some embodiments, the cable is bent around the cable bend radius guide, such that the radius of the cable is slightly larger than the minimum bend radius, preventing potential damage to the cable. However, the cable can be bent using the cable bend radius guide in any other manner. For example, in some embodiments, the cable can be bent within the loop formed by the cable bend radius guide. In these embodiments, the cable bend radius guide may form a loop slightly larger than the minimum bend radius of the cable, such that the interior of the loop can be used as a guide for cable bending without causing damage to the cable. In some embodiments, the cable is bent using a bending guide (e.g., bending guides 245-1 and 245-2 of FIG. 2 or bending guides 445-1 and 445-2 of FIG. 4).

A determination is then made whether there is an additional cable that requires bending. This is illustrated at step 530. If there is an additional cable at step 530, process 500 moves back to step 510, where the additional cable is obtained. If there is no additional cable at step 530, process 500 ends.

Figure 6:
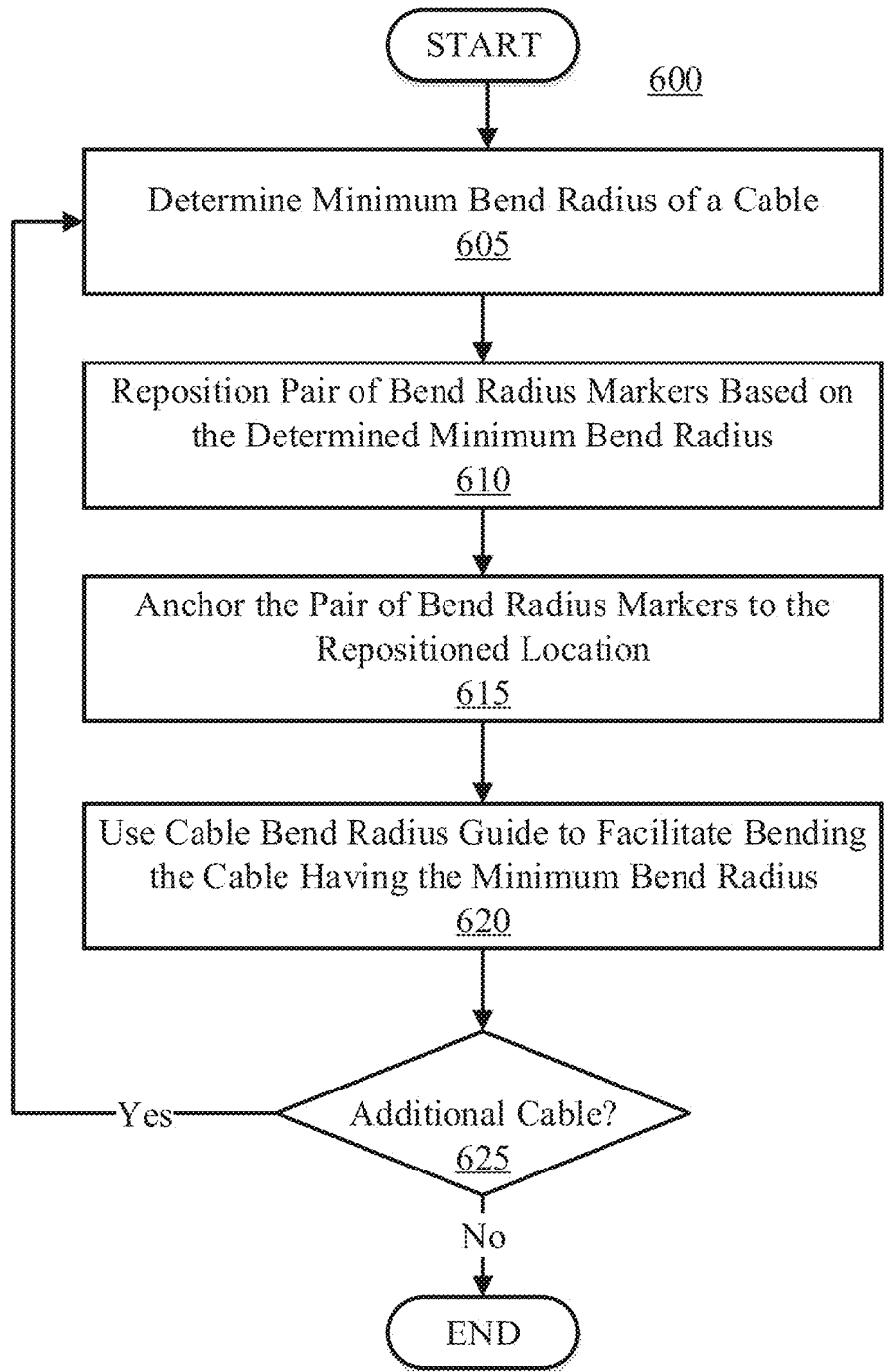
FIG. 6 is a flow diagram illustrating a process 600 for configuring a cable bend radius guide based on a cable having a minimum bend radius, in accordance with embodiments of the present disclosure.

Referring now to FIG. 6, shown is a flow diagram illustrating a process 600 for configuring a cable bend radius guide based on a cable having a minimum bend radius, in accordance with embodiments of the present disclosure.

Process 600 initiates with step 605, where a minimum bend radius "$R_m$" of a cable is determined. In some embodiments, the minimum bend radius of the cable is provided by a manufacturer. In some embodiments, the minimum bend radius can be experimentally determined. For example, several of the same type of cable can be bent with varying radii, and based on observed damage, a minimum bend radius can be determined.

A pair of bend radius markers (e.g., bend radius markers 205, 210, and 215 of FIG. 2, FIG. 3-1, and FIG. 3-2 or bend radius markers 405-1 and 405-2 of FIG. 4) are then repositioned based on the determined minimum bend radius. This is illustrated at step 610. The pair of bend radius markers can be repositioned (e.g., spread apart from the middle of the cable bend radius guide) on the cable bend radius guide (e.g., cable bend radius guide 200 of FIG. 2, FIG. 3-1, and FIG. 3-2 or cable bend radius guide 400 of FIG. 4) based on a circumference of a circle having the minimum bend radius. For example, the determined minimum bend radius "$R_m$" can be multiplied by $2\pi$ in accordance with Circumference $(C)=2\pi Rm$ to obtain the distance between the pair of bend radius guides.

After the pair of bend radius markers are repositioned with respect to a body portion (e.g., body portion 203 of FIG. 2, FIG. 3-1, and FIG. 3-2) of the cable bend radius guide, the pair of bend radius markers can be anchored to the repositioned location. This is illustrated at step 615. The pair of bend radius markers can be anchored to the body portion of the cable bend radius guide based on the fastening mechanism coupled to the bend radius markers. As an example, the bend radius markers can be latched, tied, mounted via hardware assembly (e.g., screws, bolts, etc.), glued, mounted via magnets, mounted via Velcro, etc. to the body portion of the cable bend radius guide.

The cable bend radius guide can then be used to facilitate the bending or winding of the cable having the minimum bend radius "$R_m$". This is illustrated at step 620. The cable having the minimum bend radius can be bent or wound in a similar manner to step 525 of FIG. 5. A determination is then made whether there is an additional cable having a minimum bend radius that requires bending/winding. This is illustrated at step 625. If there is an additional cable, then process 625 moves back to step 605, where a minimum bend radius of the additional cable is determined. If there is not an additional cable, then process 600 ends.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A cable bend radius guide comprising:
    a flexibly rigid linear material of a predetermined length having a pair of corresponding bend radius markers separated by a predetermined distance along the predetermined length; and
    a restraint configured to fasten a first bend radius marker and a second bend radius marker of the pair of bend radius markers together to cause a portion of the flexibly rigid linear material between the first bend radius marker and second bend radius marker to generate a substantially circular loop having a bend radius corresponding to a cable's minimum bend radius.

2. The cable bend radius guide of claim 1, wherein the pair of bend radius markers is a distinct color such that the pair of bend radius markers is visually distinguishable from a second pair of bend radius markers disposed on the flexibly rigid linear material.

3. The cable bend radius guide of claim 1, wherein the restraint is movable along the predetermined length.

4. The cable bend radius guide of claim 1, wherein the restraint is coupled to the first bend radius marker and the second bend radius marker.

5. The cable bend radius guide of claim 4, wherein the restraint is a magnet, wherein the pair of bend radius markers is fastened via a magnetic force generated by the magnetic restraint.

6. The cable bend radius guide of claim 1, further comprising:
    a pair of bending guides configured to receive and retain a cable when the cable is bent along the cable bend radius guide.

7. The cable bend radius guide of claim 6, wherein the pair of bending guides is repositionable along the predetermined length.

8. The cable bend radius guide of claim 1, wherein the pair of bend radius markers is repositionable along the predetermined length of the cable bend radius guide.

9. The cable bend radius guide of claim 8, wherein the pair of bend radius markers is configured to be anchored to the cable bend radius guide.

10. The cable bend radius guide of claim 1, wherein the flexibly rigid linear material is a galvanized steel wire.

11. A method comprising:
    providing a cable bend radius guide, the cable bend radius guide comprising:
        a flexibly rigid linear material of a predetermined length having a pair of corresponding bend radius markers separated by a predetermined distance along the predetermined length; and
        a restraint configured to fasten a first bend radius marker and a second bend radius marker of the pair of bend radius markers together to cause a portion of the flexibly rigid linear material between the first bend radius marker and second bend radius marker to generate a substantially circular loop having a bend radius corresponding to a cable's minimum bend radius;
    obtaining a cable requiring bending;
    conjoining the pair of bend radius markers by holding the first bend radius marker and the second bend radius marker together such that they are in proximity to each other and are adjacent;
    restraining the first pair of bend radius markers using the restraint; and
    bending the cable using the substantially circular loop as a reference such that the cable's bend radius is at least the minimum bend radius.

12. The method of claim 11, wherein the pair of bend radius markers is a distinct color such that the pair of bend radius markers is visually distinguishable from a second pair of bend radius markers disposed on the flexibly rigid linear material.

13. The method of claim 11, wherein the restraint is movable along the predetermined length.

14. The method of claim 11, wherein the restraint is coupled to the first bend radius marker and the second bend radius marker.

15. The method of claim 14, wherein the restraint is a magnet, wherein the pair of bend radius markers is fastened via a magnetic force generated by the magnetic restraint.

16. The method of claim 11, wherein the cable bend radius guide further comprises:
    a pair of bending guides configured to receive and retain a cable when the cable is bent along the cable bend radius guide.

17. The method of claim 16, wherein the pair of bending guides is repositionable along the predetermined length.

18. The method of claim 11, wherein the pair of bend radius markers is repositionable along the predetermined length of the cable bend radius guide.

19. The method of claim 18, wherein the pair of bend radius markers is configured to be anchored to the cable bend radius guide.

20. The method of claim 11, wherein the flexibly rigid linear material is a galvanized steel wire.

* * * * *